United States Patent [19]
Rice

[11] Patent Number: 5,999,582
[45] Date of Patent: Dec. 7, 1999

[54] HIGHER SPEED DIGITAL LOOP CARRIER TRANSMISSION SYSTEM

[75] Inventor: David Reagan Rice, Morristown, N.J.

[73] Assignee: Lucent Technologies Inc., Murray Hill, N.J.

[21] Appl. No.: 08/777,158

[22] Filed: Dec. 26, 1996

[51] Int. Cl.[6] .............................. H04L 23/00; H04L 12/50
[52] U.S. Cl. ........................ 375/377; 370/522; 370/523; 370/524
[58] Field of Search .................................. 370/523, 524, 370/522, 420; 375/377

[56] References Cited

U.S. PATENT DOCUMENTS 5,268,903  12/1993  Jones et al. ............................. 370/384
5,583,922  12/1996  Davis et al. .......................... 379/93.09

*Primary Examiner*—Stephen Chin
*Assistant Examiner*—Albert Park

[57] ABSTRACT

A method for reducing signal degradation in a Digital Loop Carrier System by removing signaling information normally embedded continuously in digital information being conveyed over the system. The system remains in this signaling free communication mode until it detects a change in its supervisory condition requiring that it exit from the signaling free communication mode or terminate communication allowing the system to enter an idle mode.

9 Claims, 4 Drawing Sheets

HIGHER SPEED DIGITAL LOOP CARRIER TRANSMISSION SYSTEM

FIELD OF THE INVENTION

This invention relates to Digital Loop Carrier Systems and in particular to a method of improving the speed at which digital information is conveyed in such systems.

DESCRIPTION OF THE RELATED ART

A Digital Loop Carrier System is a communication system where the information carried over the communication medium is in digital format. Digital Loop Carrier (DLC) systems are now often used by telephone companies as communication systems for voice, digital data information and analog data information. The voice signals are digitized before they are conveyed over the DLC system. Similarly, the analog data information, which are digital signals converted to analog signals by a modem for transmissions over POTS (Plain Old Telephone Service) loops, are digitized before they are conveyed over a DLC system.

Due to the advent of the Internet, there is an increased need to operate these DLC systems serving analog data at higher and higher bit rates. Customers accessing the Internet over POTS loops typically are connected to an Internet provider via a DLC system by means of modems that can operate at speeds of 28.8 kilobits per second or 33.6 kilobits per second. At such high speeds, the analog data signals tend to be more susceptible to noise and are more easily distorted by the communication medium. Another main contributor to signal degradation in Digital Loop Carrier Systems is the use of Robbed Bit Signaling (RBS). When RBS is used, part of the digital information is discarded and is replaced by signaling information or supervisory bits for the administration of the DLC communication system and the overall POTS loop. This technique contributes to signal degradation because part of the signal is purposely sacrificed for signaling information. Consequently, the use of RBS in DLC systems causes further signal degradation which many times results in unacceptably high bit error rates. Under such circumstances, in order to avoid unacceptable bit error rates, the modems are frequently forced to transmit and receive information at lower speeds, usually lower than 28.8 kbits/sec.

FIG. 1 depicts a typical configuration for a DLC system that uses Robbed Bit signaling. The DLC system is placed between a customer site and the Public Switched Telephone Network (PSTN) and is part of an overall POTS loop. At each end of the DLC system is a channel unit which interfaces with the user equipment and the Public Switched Telephone Network. Typically, the channel unit that interfaces with the PSTN is located at a central office and is referred to as a Central Office Terminal (COT) channel unit. The channel unit that interfaces with the customer site is commonly known as a Remote Terminal (RT) channel unit. Typically, the digital information conveyed between the channel units is in the well known format referred to as Pulse Code Modulation (PCM). COT channel unit 6 comprises PCM Coder 14, Signaling Detector and Processor 16, and PCM Decoder 18. COT 6 connects with Line Interface Unit (LIU) 20. COT channel unit 6 is connected to switch 12 by 2-wire line 4. Switch 12 is part of the Public Switched Telephone Network (PSTN) 2. Switch 12 has access to a plurality of lines from PSTN 2 and is able to redirect these lines to COT 6. Line 4 is a POTS line that is one of the many lines that can be switched from PSTN 2 to COT channel units by switch 12. An Internet provider, for example, may be switched to the PSTN POTS line 4 that is connected to COT 6. At the other end of the DLC system is Line Interface Unit 34 and Remote Terminal (RT) Channel Unit 22 comprising PCM Decoder 28, Signaling Detector and Processor 30 and PCM Coder 32. Local loop 26 connects RT 22 to customer site 36. Digital information is transmitted from COT 6 to RT 22 over communication medium 8 which is typically a T1 line. Similarly digital information is transmitted from RT 22 to COT 6 over communication medium 10 which is also typically a T1 line. T1 lines 8 and 10 may actually be part of one bidirectional communication medium that includes fiber optic links and other communication links. For the sake of simplicity, however, we assume that T1 line 8 has signals flowing from COT 6 to RT 22 and T1 line 10 allows signals to flow from RT 22 to COT 6.

The PCM source information are actually analog signals originating from POTS line 4 or customer site 36. That is, analog signals from POTS line 4 are digitized and converted to PCM format by PCM Coder 14. Similarly, analog signals from customer site 36 are digitized and converted to PCM format by PCM Coder 32. PCM information that is transmitted by a terminal is referred to as Transmitted PCM (TPCM). Information in PCM format that is received by a terminal is known as Received PCM (RPCM). The signals from customer site 36 or POTS line 4 can be analog voice signals, analog data signals, digital signals or supervisory signals. The supervisory signals represent metallic conditions at each end of the DLC system and are used for the administration of the overall POTS loop. The metallic conditions indicate the state of a POTS line or local loop. Metallic conditions associated with the administration of POTS lines (e.g. line 4), and local loops (e.g., Local loop 26) include Loop Closure (LC), Loop Open (LO), Ringing (Rng), Loop Current Feed (LCF), Reverse Loop Current Feed (RLCF) and Loop Current Feed Open (LCFO). The particular significance of each of these metallic conditions is discussed infra. These metallic conditions are detected by Signaling Detector and Processor 16,30 of COT 6 and RT 22 respectively. For example when customer site 36 goes on hook, Signaling Detector and Processor 30 detects the metallic condition of Loop Open (LO) from local loop 26 indicating that the normal communication path between customer site 36 and Remote Terminal 22 has been broken. When customer site 36 goes off hook, Signaling Detector and Processor 30 detects a Loop Closure (LC) from line 26 indicating that the normal communication path along line 26 between customer site 36 and RT 22 has been restored.

The various metallic conditions are detected and then represented as digital signaling codes by Signaling Detector and Processors 16 and 30 of COT 6 and RT 22 respectively. COT 6 and RT 22 also have the capability of causing various metallic conditions to occur at the POTS line 4 or loop 26. PCM decoder 18 converts RPCM signals to analog signals which are then transmitted over POTS line 4. Similarly, PCM decoder 28 converts RPCM signals to analog signals which are then transmitted to customer site 36 over local line 26.

During normal operation, when digital information is being conveyed between COT 6 and RT 22, one of these metallic conditions may occur at either end of the DLC. For example, at the central office end of the DLC, the occurrence of any of these conditions is detected by Signaling Detector and Processor 16. Signaling Detector and Processor 16 then generates the proper RBS code for the particular condition that occurred and transfers the code to LIU 20. LIU 20 inserts the code into the digital information in accordance with the RBS scheme and transmits the digital information embedded with signaling information over T1 line 8 to RT 22. The same procedure is executed by RT 22. For example, if the equipment at customer site 36 goes On-Hook (OH), the change is detected by Signaling Detector and Processor 30. Processor 30 will then generate the proper RBS code and transfer such code to LIU 34. LIU 34 then embeds the RBS code for On Hook in the TPCM conveyed over T1 line 10.

Still referring to FIG. 1, the digital signals being communicated between COT 6 RT 22 are organized in accordance with the DLC system protocol described in the following technical references: Digital Interface Between the SLC®96 Digital Loop Carrier System And A Local Digital Switch, Technical Reference TR-TSY-000008, Issue 2 August 1987, Bell Communications Research Inc. (Bellcore); Transport Systems Generic Requirements (TSGR): Common Requirements" Technical Analysis Report TR-NWT-000499, Issue 5, December 1993, Bell Communications Research, Inc. (Bellcore). COT 6 and RT 22 initiate and terminate communication between each other in accordance with the protocols described in the above mentioned technical references. COT 6 and RT 22 also follow the signaling schemes and formats described in these technical references. These technical references define the signaling standards and protocols for DLC systems widely followed by the telephone industry. In a typical DLC system such as the one depicted in FIG. 1, COT 6 serves a plurality of customers (POTS line) simultaneously.

Referring to FIG. 2, there is shown how the digital information is organized by COT 6 and RT 22. This particular organization of digital information uses a signaling scheme commonly referred to as AB signaling which is one version of RBS. Each of the POTS lines switched to COT 6 is sampled and each sample is converted to an 8-bit byte. COT 6 concatenates a group of 24 consecutive samples into a frame 38. Each of the 24 samples represent information from a particular communication channel. Thus, each frame contains information from 24 communication channels. A group of 12 frames is referred to as a superframe. As illustrated in FIG. 2, using the sixth frame as a representative frame, each frame contains 24 bytes. Each byte contains 8 bits which is the actual digital information that is conveyed over a particular communication channel. Thus, POTS line 4 in FIG. 1 represents one communication channel. Referring back to FIG. 2, a framing bit 42 is added to the beginning of each frame to denote the start of the frame. For the example shown in FIG. 2 and in virtually all domestic DLC systems, the frame sampling rate is 8 KHz resulting in a frame period of 125 µsec.

AB signaling is a 2 bit code that is integrated in the digital information being conveyed between the COT and the RT in a DLC system. Specifically, in the AB signaling version of RBS, for every sixth frame, the eighth bit of each of the RBS communication channels is discarded and is replaced by a signaling bit. There are two signaling bits; an "A" bit and a "B" bit. The "A" bit and the "B" bit are inserted in the digital information in alternate fashion. That is, the eighth bit of each byte in the $6^{th}$ frame is replaced by the "A" bit and the eighth bit of each byte of the $12^{th}$ frame is replaced by a "B" bit. For example, referring FIG. 2, assuming all 24 communication channels are using RBS, the eighth bit of CH1–CH24 of the $6^{th}$ frame is replaced by an "A" signaling bit 44. The eighth bit of CH1–CH24 of the $12^{th}$ frame is replaced by a "B" signaling bit (not shown). This procedure continues for every sixth frame.

Another version of RBS known as ABCD signaling is depicted in FIG. 3. In ABCD signaling, the superframe is extended by an additional 12 frames in order to encode two additional signaling bits into the digital information. In addition to the "A" and "B" signaling bits, there are the "C" and "D" signaling bits. Again, assuming that all 24 communication channels are using RBS, the eighth bit of each of the communication channels of the 18th frame is discarded and is replaced by the "C" signaling bit. Similarly, the eighth bit of each of the communication channels or time slots of the 24th frame is discarded and is replaced by the "D" signaling bit. Thus ABCD signaling is simply a 4 bit code used in RBS. The entire 4 bit code is contained within an extended superframe consisting of 24 frames.

In addition to generating the ABCD signaling bits, Signaling Detector and Processors 16 and 30 also generate "E", "F" and "G" bits which are used as administrative bits and are not transmitted over T1 lines 8 and 10. The significance of the "E" and "G"bits are not discussed herein as these bits are not pertinent to the RBS scheme and the subject matter of this invention. The "F" bit however indicates whether RBS is being used by a particular communication channel. Again, referring to FIG. 1, Signaling Detector and Processors 16 and 30 generate the F bit and set the F bit=1 whenever RBS is being used for a communication channel by the COT or RT respectively. When RBS is not being used by a communication channel, the F bit for that communication channel is set to 0. Signaling Detector and Processors 16 and 30 transfer the F bit to their respective LIUs 20 and 34. Depending on the value of the F bit, LIUs 20 and 34 decide whether to insert the signaling bits into the TPCM information. If F=1, signaling bits are inserted into the TPCM information; if F=0, the LIU disregards any signaling bits sent to it by Signaling Detector and Processor. In the receive direction, if F=1, the eighth bit of every sixth frame is transferred from the LIU to the Signaling Detector and Processor, and the bit value in the RPCM going on to the decoder is forced to a fixed value. If F=0, the eighth bit of every sixth frame is simply copied by the LIU from the RPCM to the Signaling Detector and Processor, where these bits are typically disregarded.

The signal degradation caused by RBS occurs regardless of which signaling scheme ( AB signaling or ABCD signaling) is used by the DLC system. The unacceptable bit error rates that result from the signal degradation is a direct consequence of RBS. The present invention claims a method which substantially eliminates the degrading effects of RBS during communication between channel units of a DLC system such as the one described above.

SUMMARY OF THE INVENTION

This invention provides a method for conveying information that is free of signaling information in a digital loop carrier system to reduce signal degradation experienced by the system. The digital loop carrier system has a first channel unit, a second channel unit and communication media that allow the channel units to communicate with each other. Initially each channel unit is set in an idle mode. The system detects when there is a request to commence communication and then conveys the signaling information to establish communication between the channel units. Information free of signaling information is then conveyed between the channel units. When one of the channel units detects a request to exit the signaling free communication mode or to terminate communication, the channel units exit the signaling free communication mode, and return to the idle mode if a request to terminate communication was made.

DETAILED DESCRIPTION

Figure 1:
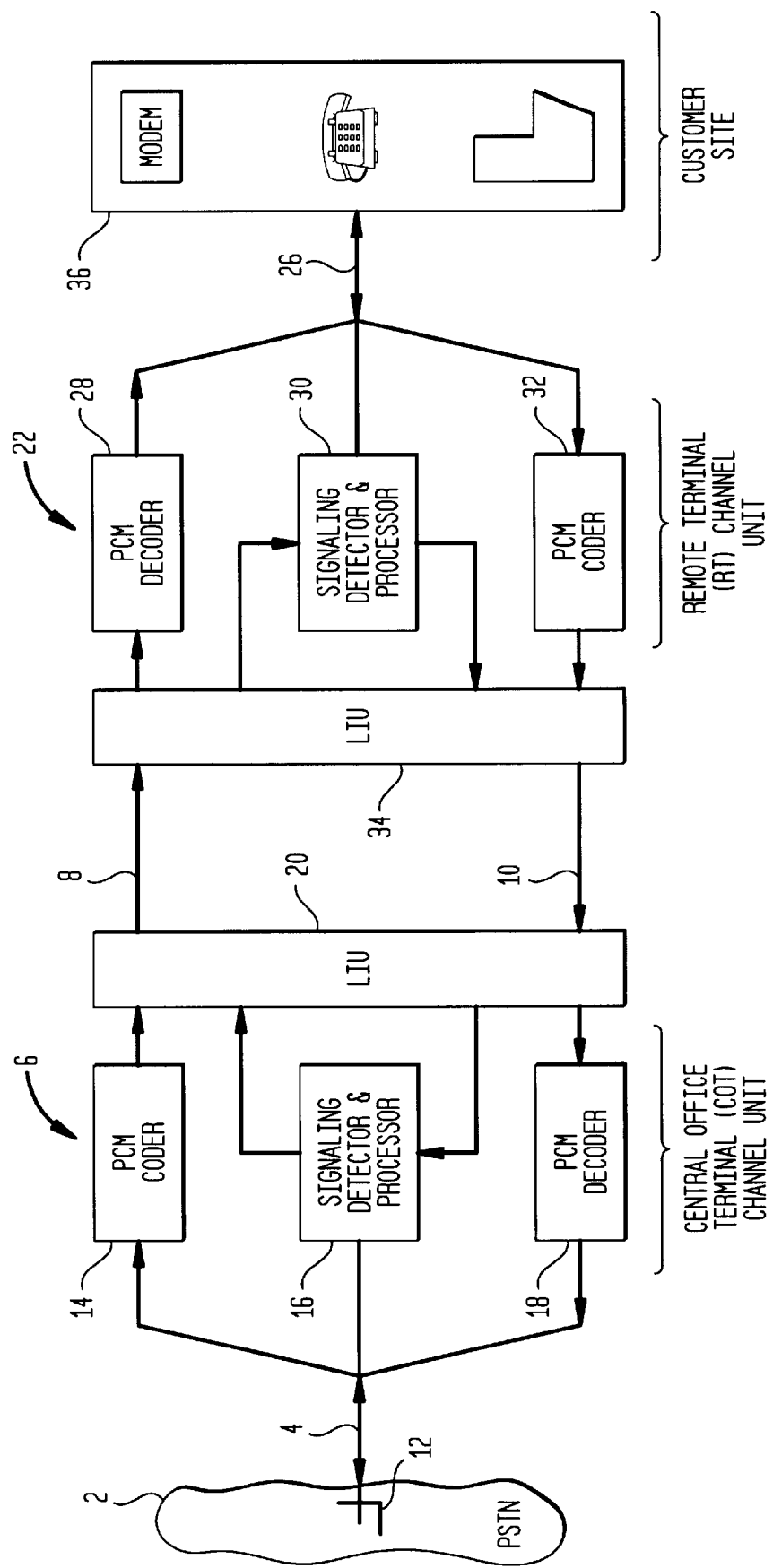
FIG. 1 depicts a typical configuration of a DLC system.
Figure 2:
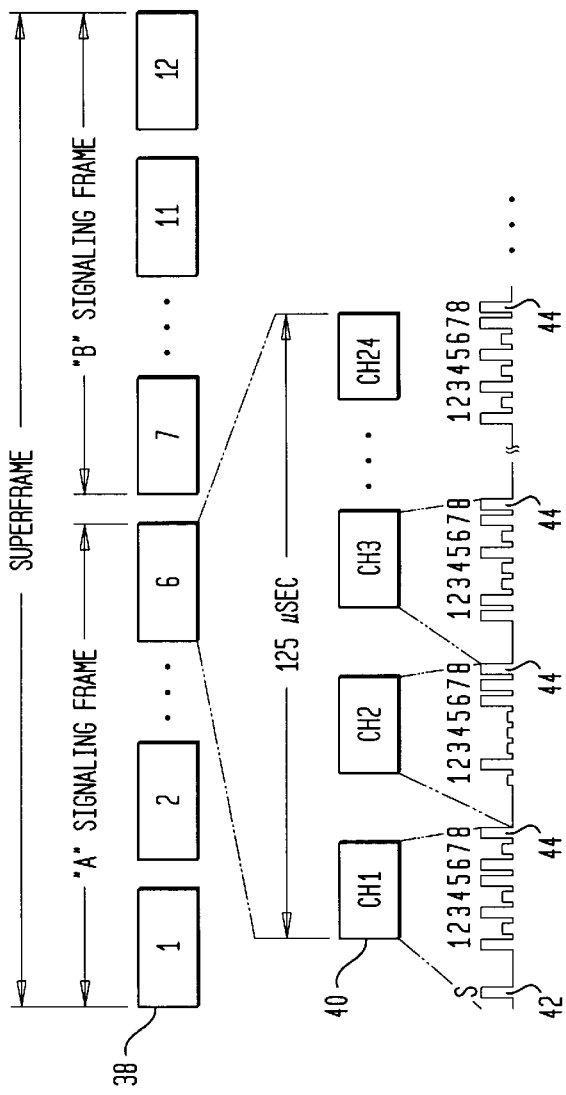
FIG. 2 depicts the organization of information conveyed over a DLC system using AB Robbed Bit Signaling.
Figure 3:
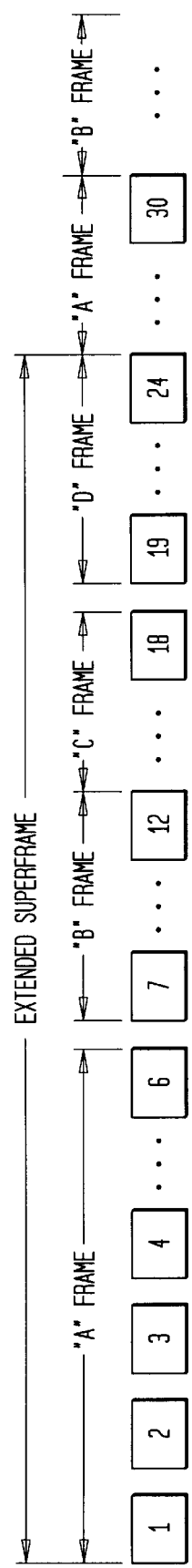
FIG. 3 depicts the organization of information conveyed over a DLC system using ABCD Robbed Bit Signaling.
Figure 4A:
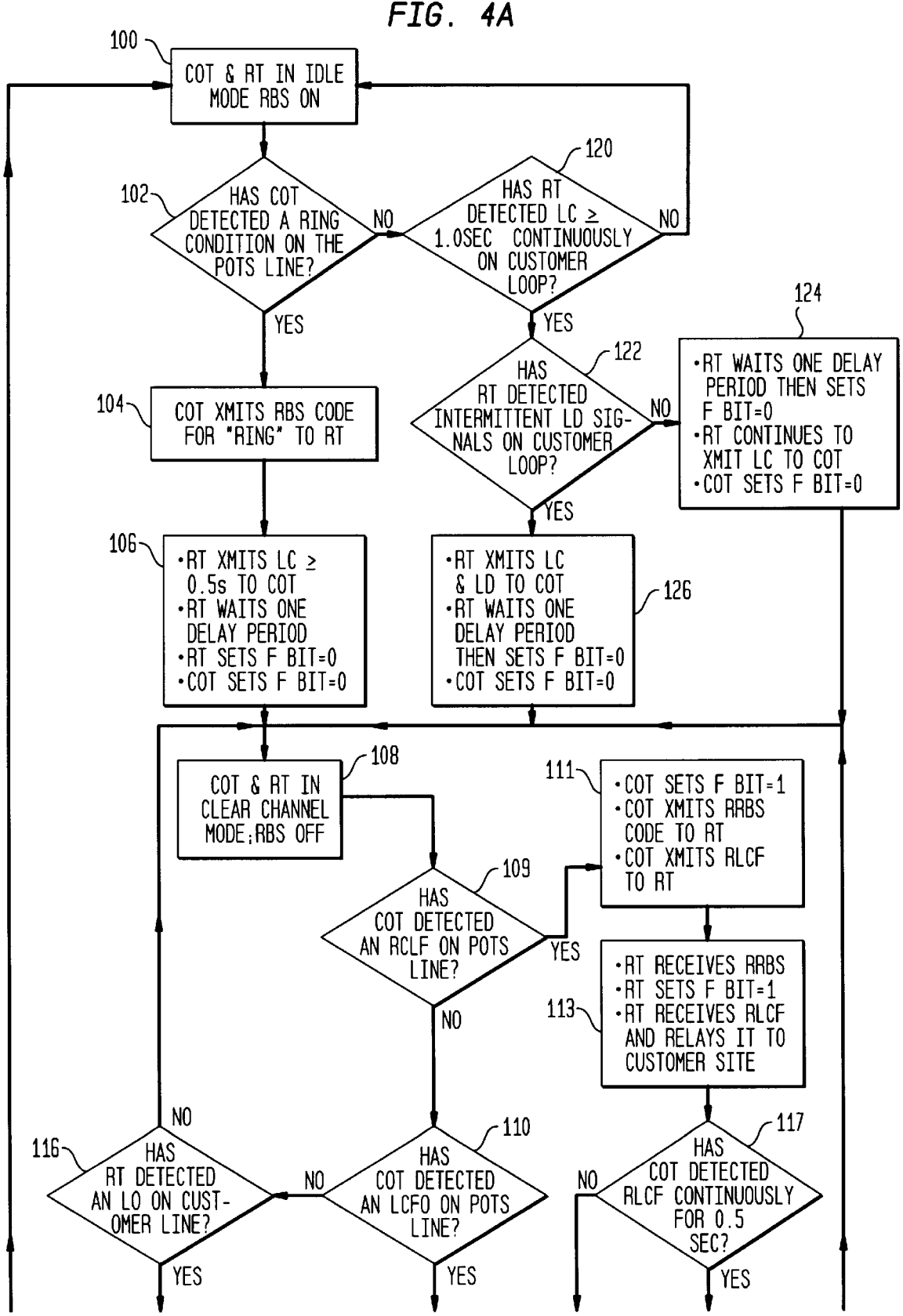
FIG. 4 depicts the method provided by the present invention.
Figure 4B:
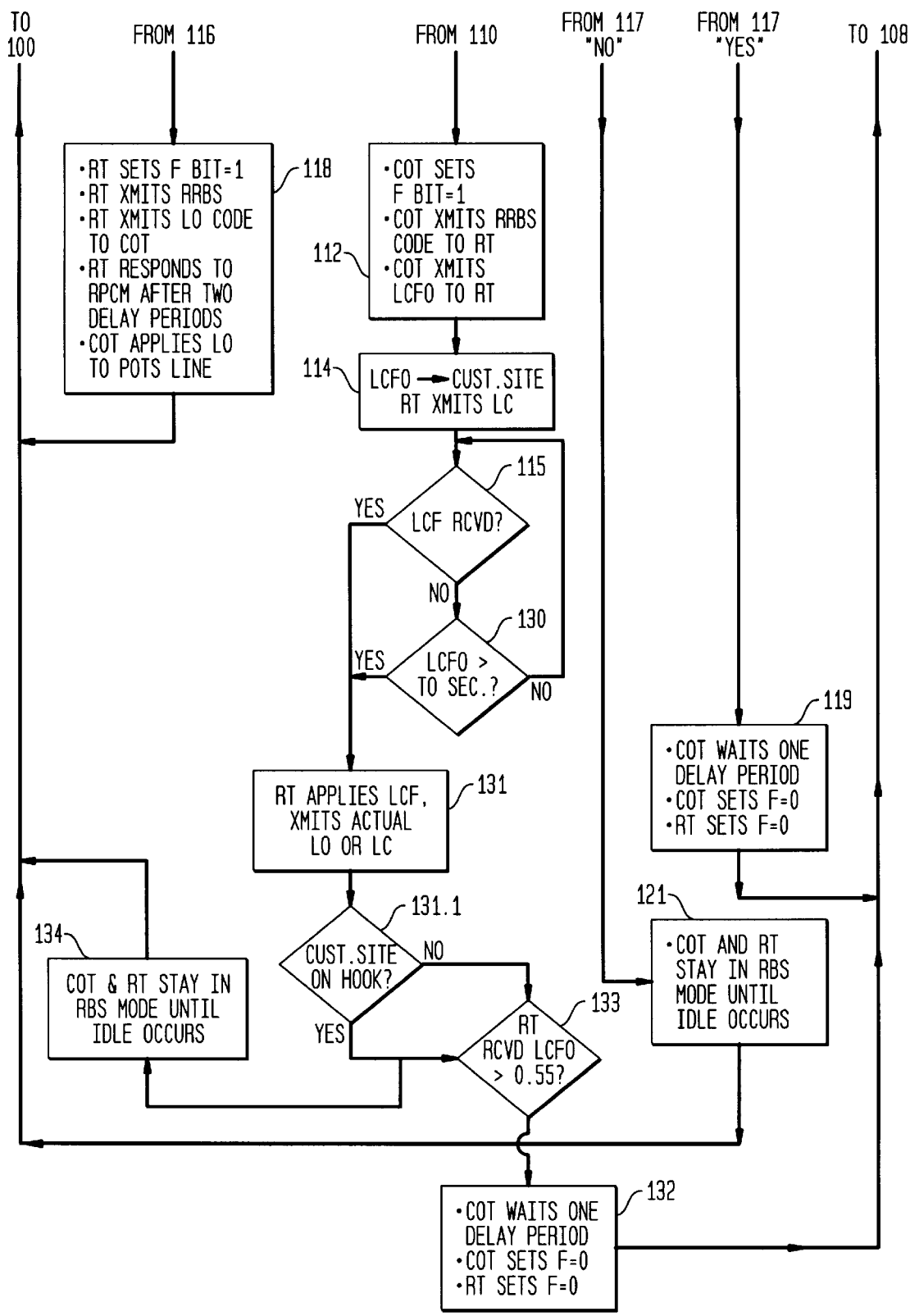

Referring to FIG. 4, a method is shown in which digital signals carrying information devoid of signaling information conveyed in a digital loop carrier system thus reducing signal degradation being experienced by the digital loop carrier system. The DLC system has a first channel unit, a second channel unit and communication media that allow the channel units to communicate with each other. The method will be described with reference to the DLC system shown in FIG. 1 but is not limited to that particular DLC configuration. Thus, the first channel unit may be represented by COT 6, the second channel unit by RT 22 and the communication media by T1 lines 8 and 10.

It should be noted that the present invention also applies to another type of DLC system commonly referred to as an integrated DLC system. In such a system the COT is replaced by a digital switch directly connected to RT 22 via T1 lines 8 and 10 provided the switch is programmed to perform signaling functions that are the same or similar to those described herein for COT 6.

In step 100, COT 6 is initially in an idle mode. That is, switch 12 is not sending a ringing signal over POTS line 4 and customer site 36 is on-hook. During idle mode, COT 6 is detecting a Loop Current Feed (LCF) metallic condition over idle POTS line 4 from switch 12. Signaling Detector and Processor 16 generates an RBS code for LCF and transfers that code to LIU 20 which transmits the code over T1 line 8 to RT 22. PCM decoder 28 of RT 22 receives the code for LCF and causes the LCF metallic condition to occur on loop 26.

In similar fashion, in the idle mode RT 22 is detecting a Loop Open (LO) metallic condition from customer site 36 indicating that customer site 36 is On Hook and is not making a request to commence communication. Signaling Detector and Processor 30 generates the RBS code for LO and transfers the code to LIU 34 which transmits the code to COT 6 over T1 line 10. At this point a request to commence communication can originate either from POTS line 4 sending a Ring signal or from customer site 36 going Off Hook.

In step 102, Signaling Detector and Processor 16 of COT 6 is continually monitoring the POTS line 4 for a Ring (Rng) signal. The occurrence of a Ring signal indicates that POTS line 4 has made a request to commence communication with customer site 36. In step 104, COT 6 has detected a Ring signal on POTS line 4. The channel units now convey signaling information between each other to establish communication. Signaling Detector and Processor 16 generates the RBS code for a Ring signal and transfers the code to LIU 20 which transmits the code to RT 22 over T1 line 8. LIU 34 of RT 22 receives the RPCM Ring signal RBS code and transfers the code to PCM decoder 28 and Signaling Detector and Processor 30. Signaling Detector and Processor 30 determines that the received RBS code is indeed the code for Ring. Processor 30 then causes a Ring signal to be sent over loop 26 to customer site 36. In step 106, upon receiving the Ring signal, customer site 36 effects a Loop Closure (LC) condition on loop 26 for at least 0.5 second which is detected by Signaling Detector and Processor 30 of RT 22. Signaling Detector and Processor 30 then transfers the RBS code for Loop Closure to LIU 34 which transmits the code to COT 6 over T1 line 10. Both COT 6 and RT 22 channel units now program themselves and their LIUs to convey information between each other without the use of signaling information. This is done by setting the F bit of both channel units to 0. Signaling Detector and Processor 30 sets the F bit for this communication channel (line 4/loop 26) to 0 and transfers the F bit to LIU 34 of RT 22. Upon receiving a zero F bit, LIU 34 terminates RBS and enters into a Clear Channel (CC) mode or a signaling free communication mode for this communication channel (line 4/ loop 26) whereby LIU 34 no longer inserts signaling bits into the TPCM conveyed over T1 line 10 and does not force the eighth bit of every sixth frame of RPCM to a fixed value.

However, Signaling Detector and Processor 30 of RT 22 does not set the F bit=0 immediately. Signaling Detector and Processor 30 waits for a period of time equaling the signaling propagation delay between COT 6 and RT 22. The signaling propagation delay period is the time it takes an RBS code to propagate from RT 22 to COT 6 or from COT 6 to RT 22. Once the propagation delay period has elapsed, the F bit is set to 0 which causes LIU 34 to transmit clear channel information and no longer force the eighth bit of every sixth frame of the RPCM to a fixed value. One delay period later or thereabouts COT 6 has received the 0.5 sec LC signal originally sent by LIU 34. COT 6 also enters into the clear channel mode (Processor 16 sets F bit=0 for line 4 and transfers F bit=0 to LIU 20) and starts to transmit clear channel information. Therefore, COT 6 and RT 22 will both be in the clear channel mode after at least one delay period has elapsed from the time the LC 0.5 second threshold of the signal was transmitted from RT 22 to COT 6.

In step 108, the DLC system is in the clear channel mode. The clear channel mode is a signaling free communication mode in that no signaling bits are inserted in the digital information being conveyed between COT 6 and RT 22. Both terminals remain in the clear channel mode and will revert to the RBS mode only when either one of two conditions occurs. The first condition is the occurrence of either an RLCF or LCFO condition on POTS line 4 and the second condition is the occurrence of an LO on loop 26.

In step 109, COT 6 is monitoring POTS line 4 to determine if a Reverse Loop Current Feed (RLCF) metallic condition has occurred. The RLCF signal is used in public terminal ("smart" payphone) applications to indicate to a calling terminal or originating terminal that the called terminal is Off Hook.

In step 110, COT 6 is monitoring POTS line 4 to determine if a Loop Current Feed Open (LCFO) condition is present. An LCFO on POTS line 4 is another one of the two conditions which causes a reversion to RBS mode. The LCFO signal is also known as a forward disconnect signal indicating that the POTS loop 4 is about to terminate communication.

Upon the occurrence of an LCFO condition, COT 6 and RT 22 exchange signaling information in order to re-establish communication between customer site 36 and POTS loop 4 whereby signaling information is embedded in the digital information conveyed over the DLC system. Specifically, in step 112, upon detecting the LCFO metallic condition, Signal Detector and Processor 16 of COT 6 sets the F bit=1 and transfers that bit to LIU 20. COT 6 is now in the RBS mode. Processor 16 also generates a Return to Robbed Bit Signaling (RRBS) code and transfers it to LIU 20 which transmits the RRBS code to RT 22 over T1 line 8.

Signaling Detector and Processor 16 then generates the RBS code for LCFO, transfers that code to LIU 20 which also transmits the code to RT 22 over T1 line 8.

The RRBS code is generated by sending a designed sequence of bits in the RBS positions of a DLC system in accordance with AB signaling or ABCD signaling. For a code length of N bits, COT 6 or RT 22 compares every sequence of N RPCM signaling bits with the prescribed code.

In step 114, RT has detected the RRBS code from COT 6. COT 6 and RT 22 have this capability because the LIU, despite operating in the Clear Channel (CC) mode copies the bits occupying the signaling positions to the Signaling Detector and Processor. Signaling Detector and Processor 30 of RT 22 sets the F bit=1 and transfers it to LIU 34. RT 22 then receives the LCFO code from COT 6. Signaling detector and Processor 30 determines that the RPCM information is an RBS code for LCFO and applies that condition to loop 26. In step 114.1, RT 22 determines whether an LO condition exists on loop 26. If LO condition exists on loop 26, step 115 is performed. In step 115, after detecting the LCFO condition at RT 22, customer site 36 goes On Hook causing a Loop Open (LO) condition to occur on line 26 which is detected by RT 22. Signaling detector and processor 30 generates the RBS code for LO and transfers it to LIU 34 which transmits it to COT 6 over T1 line 10. Switch 12 then restores the Loop Current Feed (LCF) condition to line 4 confirming end of communication between line 4 and customer site 36. COT 6 detects the LCF condition and the DLC system returns to step 100 where COT 6 and RT 22 are idle and in the RBS mode remaining in this state until the conditions for clear channel operation occur.

Returning to step 114.1, if an LO is not detected by RT 22, the LCFO signal may not have occurred for more than 0.5 second. In step 130, COT 6 determines whether LCFO occurred for more than 0.5 second. It may happen that the LCFO interval ends before customer 36 abandons the call by going on hook. If the LCFO interval in this case is short enough, (0.5 second or less), it is desirable no to abandon the clear channel mode of operation. Accordingly, when the outcome of decision step 130 is that the LCFO interval has ended in 0.5 sec. or less, step 132 is performed. That is, COT 6 waits for one signaling delay to assure that the RBS code for LCF, which it is now sending, is received and acted upon by RT 22. Then both COT and RT set F=0, reestablishing the Clear Channel mode.

For the case where the LCFO interval exceeds 0.5 second without the customer abandoning the call by going on hook, step 134 shows that the COT and RT decide to remain in the RBS mode until the next idle condition occurs, returning to step 100.

Returning to step 109, if COT 6 detects an RLCF condition on POTS line 4, step 111 is performed. That is, upon detecting the RLCF metallic condition, Signal Detector and Processor 16 of COT 6 sets the F bit=1 and transfers that bit to LIU 20. COT 6 is now in the RBS mode. Processor 16 also generates a Return to Robbed Bit Signaling (RRBS) code and transfers it to LIU 20 which transmits the RRBS code to RT 22 over T1 line 8. Signaling Detector and Processor 16 then generates the RBS code for RLCF, transfers that code to LIU 20 which also transmits the code to RT 22 over T1 line 8.

In step 113, RT has detected the RRBS code from COT 6. Signaling Detector and Processor 30 of RT 22 sets the F bit=1 and transfers it to LIU 34. RT 22 then receives the RLCF code from COT 6. Signaling detector and Processor 30 determines that the RBS code is indeed the code for RLCF and applies that condition to loop 26.

In step 117, COT 6 has been monitoring continuously POTS line 4 for an RLCF condition. If an RLCF condition has occurred for at least 0.5 second, step 119 is performed. That is, Signaling Detector and Processor 16 of COT 6 continues to generate the code for RLCF and to transfer that code to LIU 20 which transmits the code to RT 22. COT 6 waits for one propagation delay period to assure that RT 22 receives at least 0.5 second of RLCF via RPCM and then enters the Clear Channel mode by setting its F bit=0. Similarly, RT 22 enters the Clear Channel mode (setting its F bit=0)upon receiving 0.5 second of continuous RLCF in RPCM format from COT 6.

Returning to step 117, if COT 6 detects an interruption of RLCF before 0.5 second has elapsed, it transmits the new signaling condition LCF or LCFO to RT 22. In step 121, both COT 6 and RT 22 perform as if the RLCF did not occur and remain in the RBS mode. The DLC system returns to the idle mode, i.e., step 100, when all the conditions for this mode as discussed above have been met.

The second condition which causes a reversion to RBS mode occurs when COT 6 receives an RRBS code from RT 22 during clear channel mode operation. This indicates that customer site 36 has gone On Hook causing an LO condition to exist on loop 26. In step 116, RT 22 is continuously monitoring loop 26 for this condition. In step 18, RT 22 has detected the On Hook condition which causes RT 22 to set its F bit to 1. Signaling detector and Processor 30 generates the RRBS code and then transmits the RRBS code followed by the RBS code for Loop Open (LO) to COT 6. RT 22 then waits for at least two signaling propagation time periods before it starts interpreting the eighth bit of every sixth frame of the channel for use as signaling information. This is to ensure that COT 6 has had enough time to receive the RRBS code, has switched to RBS mode, and has commenced transmitting RBS codes. Thus, upon receiving the RRBS code and the RBS code for LO from RT 22, Signaling Detector and Processor 16 of COT 6 immediately sets its F bit =1. Signaling Detector and Processor 16 applies the LO condition to line 4. The DLC system returns to step 100 with RT 22 still detecting the LO signal from customer site 36 causing it to enter into idle mode. COT 6 is still detecting LCF from switch 12. Upon receiving LO from RT 22 COT 6 also enters the idle mode.

It should be noted that whichever code is selected for the RRBS code, there exists a finite probability that during clear channel mode either RT 22 or COT 6 may detect a false RRBS signal. That is, the code for RRBS may be accidentally replicated during the clear channel mode (clear channel RPCM information incorrectly interpreted as RRBS code). The consequence of such a false signal is that a momentary blockage of data would occur at either RT 22 or COT 6 for a few milliseconds. The solution to this problem is to devise an RRBS code whose bit length is such that the probability of a false RRBS code is sufficiently small.

The length N of the code has been calculated to achieve a probability of less than 10% that one or more trials matches the random code in a one hour interval. For this particular objective, the resulting length of the code is 26 bits. While in the Clear Channel mode, each Signal Detector and Processor must examine every block of N bits to determine whether an actual code was sent. The block of N bits are shifted into an N-bit register (not shown) which attempts to match the received block with a known code pattern. This is done by shifting one bit at a time into the register thus defining the new sequence.

To preclude a situation where one Channel Unit has incorrectly returned to the RBS mode while the other Channel Unit remains in the Clear Channel mode, this invention requires that each Channel Unit while in the RBS mode periodically send the RRBS code. This period might be, for example, one minute. If one of the channel units is improperly in the RBS mode, this feature will return the system to the RBS mode and allow the system to re-enter the Clear Channel mode after an idle condition has occurred. If one of the channel units is improperly in the Clear Channel mode, this feature allows the system to return to the RBS mode. This feature requires the system to react to only system defined RRBS code and not to react to other codes or random bit patterns that may appear to be codes. Many existing channel units already have this feature whereby they will react only to system defined codes.

Returning to step 100, where COT 6 and RT 22 are both idle, while COT 6 is monitoring POTS line 4 for a Ring signal in step 102, RT is monitoring loop 26 for a 1.0 sec. Loop Closure (LC) signal in step 120. In step 122, RT has detected an LC signal lasting at least 1.0 sec indicating that customer site 36 is commencing communication. The channel units now convey signaling information between each other to establish communication. Also, in step 122 RT 22 is further detecting if the LC signal is followed by a series of intermittent Loop Open (LO) signals indicating that customer 36 is transmitting pulse dialing signals.

In step 126, RT 22 has detected the pulse dialing signals. Signaling detector and Processor 30 generates the RBS codes for LC and LO and transfers these codes to LIU 34 which transmits the codes as TPCM signals over T1 line 10 to COT 6. Signaling Detector and Processor 30 then waits for one signaling propagation delay period and then sets its F bit=0. This is to ensure that COT 6 did receive the LC and LO codes causing COT 6 to set its F bit=0. COT 6 and RT 22 are now in the signaling free communication mode or the clear channel mode. The DLC system now moves to step 108 and follows the same process from step 108 as described above.

Returning to step 122, if RT 22 does not detect intermittent LO signals from customer site 36 after detecting a LC signal for at least 1.0 sec., the DLC system moves to step 124. In step 124, customer 36 is about to commence communication because the signal received, LC>1.0 sec, probably denotes that a touch tone signal, i.e., a DTMF (Dual Tone Multiple Frequency) signal, is being used for addressing PSTN 2. Signaling Detector and Processor 30 continues to generate the RBS code for LC, transferring it to LIU 34 which transmits the code to COT 6 by way of T1 line 10. Signal Detector and Processor 30 waits for one propagation delay period before it sets the F bit=0. The F bit is then transferred to LIU 34 which then immediately terminates RBS mode. Before then RT 22 has continued to transmit LC to COT 6 until it sets its F bit=0. Upon reception of a Loop Closure (LC) signal for at least 1.0 sec., Signaling Detector and Processor 16 of COT 6 sets its F bit=0 and transfers that bit to LIU 20 resulting in the termination of RBS mode. The DLC system now moves to step 108 where both COT 6 and RT 22 remain in the clear channel mode until the conditions of RBS mode occur. In step 122 if customer site 36 had delayed dial pulsing causing the DLC system to mistakenly execute step 124, RT 22 and COT 6 are redirected to step 126 via steps 108, 109, 110, 116, 118, 100, 102, 120 and 122.

I claim:

1. A method for conveying information free of signaling information over a digital loop carrier communication system in accordance with a protocol being followed by the digital loop carrier communication system, the digital loop carrier communication system has at least a first channel unit, at least a second channel unit and communication media for conveying the information including the signaling information between the channel units, the method comprising the steps of:

detecting an initiation of communication between the channel units;

establishing communication between the channel units;

entering into a signaling free communication mode where the information conveyed between the channel units contains no signaling information thereby reducing signal degradation experienced by the communication system;

detecting a request to either exit the signaling free communication mode or to terminate communication; and generating a return to signaling mode signal thus allowing the channel units to exit from the signaling free communication mode or to terminate communication between each other.

2. The method of claim 1 where the step of generating a return to signaling mode signal is accomplished by generating a RRBS code.

3. The method of claim 2 wherein the RRBS code is devised to reduce the probability of a false return to RBS mode.

4. The method of claim 2 wherein one of the at least first or second channel units that has entered signaling free communication mode periodically sends the RRBS code to the one of the at least first or second channel units to prevent the at least first or second channel units from incorrectly returning to the signaling free communication mode.

5. The method of claim 1 wherein the step of detecting the initiation of communication between the channel units comprises the steps of:

monitoring information received by the channel units and determining whether the incoming information request to initiate communication between the channel units.

6. The method of claim 1 wherein the step of establishing communication between the channel units comprises the step of:

conveying signaling information between the channel units indicating the occurrence of a request to initiate communication.

7. The method of claim 1 wherein the step of entering into a signaling free communication mode comprises the steps of:

programming the channel units to convey information to each other without the use of signaling information;

allowing the channel units to convey information to each other that is free of signaling information and monitoring continually the conveyed information to determine if a request to terminate communication or to exit the signaling free communication mode has been made.

8. The method of claim 1 wherein the signaling information is conveyed in accordance with a RBS signaling scheme.

9. The method of claim 1 where the step of generating a return to signaling mode signal thus allowing the channel units to exit from the signaling free communication mode is based on metallic conditions present in a POTS system connected to the DLC system.

* * * * *